US008605580B2

(12) United States Patent
Verma et al.

(10) Patent No.: US 8,605,580 B2
(45) Date of Patent: Dec. 10, 2013

(54) MAXIMIZATION OF THROUGHPUT UNDER A FAIRNESS CONSTRAINT IN DWDM-BASED OPTICAL NETWORKS

(75) Inventors: Pramode K. Verma, Tulsa, OK (US); Yingzhen Qu, San Jose, CA (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 478 days.

(21) Appl. No.: 11/773,852

(22) Filed: Jul. 5, 2007

(65) Prior Publication Data
US 2008/0008189 A1 Jan. 10, 2008

Related U.S. Application Data

(60) Provisional application No. 60/818,611, filed on Jul. 5, 2006.

(51) Int. Cl.
*H04J 1/16* (2006.01)
(52) U.S. Cl.
USPC .......................................................... 370/230
(58) Field of Classification Search
USPC .......................................................... 370/230
See application file for complete search history.

(56) References Cited

U.S. PATENT DOCUMENTS

| | | | | |
|---|---|---|---|---|
| 2001/0028488 A1* | 10/2001 | Kim et al. | | 359/124 |
| 2003/0035169 A1* | 2/2003 | Byers et al. | | 359/124 |
| 2003/0189933 A1* | 10/2003 | Ozugur et al. | | 370/395.1 |
| 2004/0147257 A1* | 7/2004 | Phillips et al. | | 455/427 |
| 2005/0237936 A1* | 10/2005 | Verma et al. | | 370/232 |
| 2006/0198299 A1* | 9/2006 | Brzezinski et al. | | 370/229 |
| 2008/0212518 A1* | 9/2008 | Wells | | 370/316 |

OTHER PUBLICATIONS

Yingzhen Qu, Pramode K. Verma, John Y Cheung, Enhancing the Carry Capacity of a DWDM Network, 2004, IEEE.*
Verma et al; Limits on the Traffic Carrying Capacity of Optical Networks with an Arbitrary Topology; Oct. 2004; IEEE; vol. 8 No. 10; pp. 641-643.*
Ruan, et al., "Optical Networks—Recent Advances", Wavelength Assignment Algorithms for WDM Ring Architectures, pp. 19-45, 2001.
Zang, et al., "A review of routing and wavelength assignment approaches for wavelength-routed optical WDM networks", Optical Networks Magazine, vol. 1, No. 1, pp. 47-60, Aug. 1999.
Barry, et al., "Models of blocking probability in all-optical networks with and without wavelength changers", IEEE journal on selected areas in communications, vol. 14 No. 5, pp. 858-867, Jun. 1996.
Li, et al., "Traffic Classification and Service in Wavelength Routed All-optical Networks", Communications, 2003. ICC '03. IEEE International Conference on , vol. 2, 11-15, pp. 1375-1380 May 2003.
Ellinas, G., "Wavelength Assignment Algorithms for WDM Ring Architectures", Optical Networks—Recent Advances, L. Ruan and D. Z. Du (Eds.) pp. 19-45. (Not Provided).

(Continued)

*Primary Examiner* — Mark Rinehart
*Assistant Examiner* — Christopher R Crompton
(74) *Attorney, Agent, or Firm* — Dunlap Codding, P.C.

(57) ABSTRACT

A method for enhancing the carrying capacity of a network, comprising the steps of detecting the level of traffic incident on the network, and reserving, dynamically, wavelengths for a class of traffic according to the level of traffic incident on the network. The network can be a dense wavelength division multiplexing optical network.

15 Claims, 4 Drawing Sheets

(56) References Cited

OTHER PUBLICATIONS

Birman, et al., "Routing and wavelength assignment methods in single-hop all-optical networks with blocking", INFOCOM '95. Fourteenth Annual Joint Conference of the IEEE Computer and Communications Societies. Bringing Information to People. Proceedings. IEEE, vol. 2, 2-6, pp. 431-438, Apr. 1995.

Qu, et al., Enhancing the Carrying Capacity of a DWDM Network:, Proceedings of 2004 International Conference on Parallel Processing Workshops (ICPPW'04), IEEE Communication Society, pp. 415-421, Aug. 2004, Montreal, Canada.

Qu, et al., "Limits on the Traffic Carrying Capacity of Optical Networks with an Arbitrary Topology", IEEE Communications Letters, pp. 641-643, Oct. 2004.

Qu, et al., "Wavelength Reservation and Congestion Control in Optical Networks", Proceedings of the IASTED International Conference on Optical Communications Systems and Networks (OSCN 2004), pp. 790-795, Jul. 2004, Banff, Canada.

Lemieux, C., Theory of Flow Control in Shared Networks and Its Application in the Canadian Telephone Network:, IEEE Transactions on Communications, vol. 29, No. 4, pp. 399-413, Apr. 1981.

* cited by examiner

MAXIMIZATION OF THROUGHPUT UNDER A FAIRNESS CONSTRAINT IN DWDM-BASED OPTICAL NETWORKS

CROSS-REFERENCE TO RELATED APPLICATIONS

The present patent application claims priority to the provisional patent application identified by U.S. Ser. No. 60/818,611 filed on Jul. 5, 2006, the entire content of which is hereby incorporated herein by reference.

STATEMENT REGARDING FEDERALLY SPONSORED RESEARCH OR DEVELOPMENT

Not Applicable.

BACKGROUND OF THE INVENTION

Recent literature on dense wavelength division multiplexing ("DWDM") networking [1-5] has shown that as traffic traverses more number of hops, it suffers a higher blocking probability than traffic with less number of hops. This causes 'unfairness' among the different classes of service characterized by the number of hops between the source node and the destination node. In [5], the technique of protection threshold is used, where the single-hop traffic is assigned an idle wavelength only if the number of idle wavelengths on the link is at or above a given threshold. In [3], the Traffic Classification and Service method is introduced to optimize the fairness problem, where all the available wavelengths are divided into a number of wavebands, and preference is given to multi-hop traffic. Thus, the blocking probability of multi-hop traffic is lowered at the cost of an increase in the blocking probability of single-hop traffic, as well as a decrease in the traffic carrying capacity of the network. An alternative to the Traffic Classification and Service has been proposed in [6] that requires connection request to a waveband of a lower class should all the wavelengths reserved for its own class be fully occupied. Further, [7] has shown that bumping multi-hop traffic from its own class to a lower class will result in a precipitous drop in throughput under heavy load conditions. Reference [8] proposes an algorithm that solves the fairness problem under normal load condition by using downward overflow and switching to a fixed route, pre-assigned wavelengths for all source-destination pairs under heavy load conditions.

Under normal conditions, the carried traffic or the throughput of a network increases as the incident connection requests increase. However, if the network is congested, the carried traffic will remain constant or even decrease as the incident traffic increases [9].

DETAILED DESCRIPTION OF THE INVENTION

Figure 1:
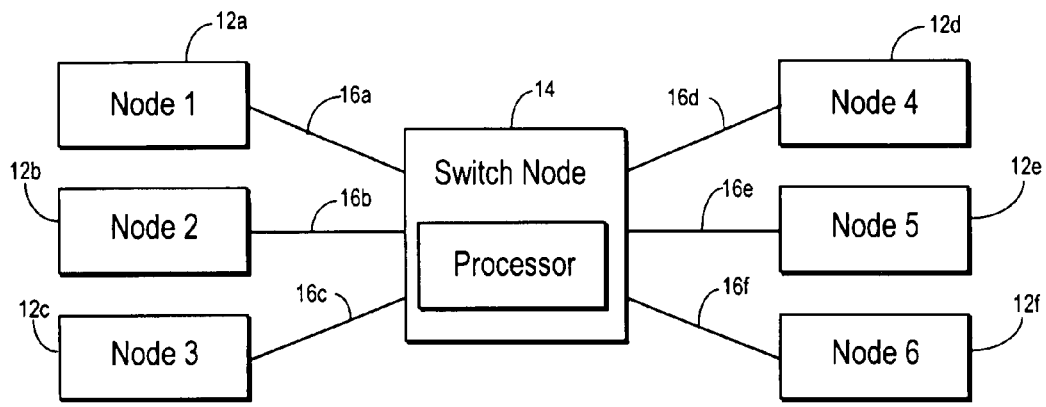
FIG. 1 is a schematic view of an exemplary network constructed in accordance with the present invention.

Referring now to the drawings and, in particular, to FIG. 1, shown therein and designated by a reference numeral 10 is an exemplary network constructed in accordance with the present invention. The network 10 is provided with a plurality of computer or terminal nodes 12 and one or more switch nodes 14. Six of the terminal nodes 12 are depicted in FIG. 1 and designated by the reference numerals 12$a$-$f$, and one of the switch nodes 14 is depicted in FIG. 1. The network 10 is also provided with a plurality of signal paths 16$a$-$f$ which connect the terminal nodes 12$a$-$f$ with the switch node 14 to permit communication between the terminal nodes 12$a$-$f$ and the switch node 14.

In a preferred embodiment, the network 10 is configured as a dense wavelength division multiplexing (DWDM) optical network. However, the network 10 can be configured in other manners, such as a legacy circuit switched network.

The terminal nodes 12 can be any devices capable of communicating with each other via the signal paths 12$a$-$f$, such as computers or telephones.

Although the network 10 is shown in FIG. 1 as having a star topology, it should be understood that the network 10 can be provided with other topologies, such as a bus topology, mesh topology, or ring topology.

The switching node 14 can be a network router or any other electronic and/or optical device capable of directing, routing or otherwise controlling traffic on the network 10. Although the switching node 14 is shown separately from the terminal nodes 12$a$-$f$, it should be understood that the switching node 14 can be either separate from one or more of the terminal nodes 12$a$-$f$, or incorporated within one or more of the terminal nodes 12$a$-$f$. For example, in a ring topology, the functionality of the switching node 14 would be incorporated as instructions running on one or more of the processors of the terminal nodes 12$a$-$f$.

In accordance with the present invention, a new algorithm named the Congestion Aware Wavelength Reservation (CAWR) algorithm addresses the fairness problem while maximizing the throughput of the network 10. The new algorithm is stored on one or more computer readable medium and preferably includes instructions executable by one or more processors of one or more terminal node 12$a$-$f$ or switching node 14 on the network 10. Examples of computer readable mediums include memory (Random Access Memory (RAM) or Read Only Memory (ROM)), a magnetic storage device, or an optical storage device, such as a CD-ROM. The proposed algorithm dynamically reserves a number of wavelengths for a class of traffic according to the congestion situation in the network. The proposed algorithm preferably addresses the entire spectrum of traffic load seamlessly maximizing the throughput while providing fairness at the same time.

I. Analysis of the Congestion Aware Wavelength Reservation Algorithm

Assume there is a signal path whose (maximum) capacity to carry information is at C bits/second. In general, the traffic incident upon the signal path can be categorized as a "light load condition", a "normal load condition" or a "high" or "heavy" "load condition". If, on the average, over a period under consideration, the utilization of the line (i.e., the percentage of time it's carrying bits at the rate of C bits/second), is between 0% to 40%, it can be considered lightly loaded, 40 to 70% at normal load and above 70% heavily loaded.

During light load conditions, sharing wavelengths among all traffic connection requests results in high throughput because no traffic is lost due to wavelengths being artificially restricted from carrying any traffic. On the other hand, when the incident traffic load is high, sharing all wavelengths resources among all classes of traffic leads to a waste of network resources [7]. This is because for multi-hop traffic, if any hop along its route from a source node (one of the terminal nodes 12a-f) to a destination node (one of the other terminal nodes 12a-f) is blocked, the traffic is lost. It is entirely possible, even likely, that a multi-hop connection request is rejected after it has cleared several hops, under high traffic conditions. In other words, under such a situation, the multi-hop traffic does not produce any throughput, and actually results in wasting network resources. Thus, under heavy load conditions, the proposed solution is to predefine a route and a set of wavelengths for every source-destination node pair. This would mean that once the multi-hop traffic identifies the first available wavelength on the first physical link, it's guaranteed to reach the destination. Thus, in general, under light load conditions, network resources are shared among all traffic connection requests, while under heavy load conditions, the routes are fixed and wavelengths are assigned for every source-destination pair [5]. This is the essence of the proposed Congestion Aware Wavelength Reservation (CAWR) method.

CAWR thus resolves the fairness and throughput issues both at the low and the high traffic situations. In between these two extremes, i.e., during normal load conditions, there would be situations that need to be addressed differently, i.e., where the CAWR method takes advantage of both wavelength sharing, and fixed routing and wavelength assignment. In order to accomplish this, the CAWR algorithm causes the switch node 14 to reserve wavelengths for a source-destination node-pair, as well as share wavelengths. For a particular connection request, the algorithm will first try to find a free wavelength among the reserved wavelengths for the node-pair; if all the reserved wavelengths are in use, it will search for an available wavelength from the shared wavelengths. If it cannot find a wavelength among the shared wavelengths, the connection request is rejected. For a certain traffic distribution, or incident traffic matrix, the following heuristic is proposed to find the number of reserved wavelengths for each source-destination node pair:

P = the number of wavelengths reserved between the source and the destination;
W = 1;
For ( i=1; i<=P; i++ )
{
    Modify the wavelength reservation;
    Establish connections;
    Calculate the generated revenue R(i);
    If R(i) > R(i−1)
        W=i;
}

Figure 2:
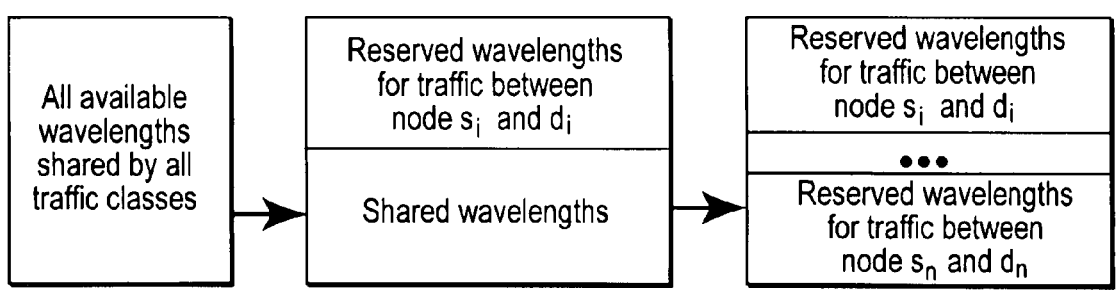
FIG. 2 is a diagrammatic view of a congestion aware wavelength reservation method (hereinafter referred to as "CAWR method") developed in accordance with the present invention.

This algorithm simply calculates the network revenue with all possible wavelength reservations, and chooses the one which yields the most revenue. We assume that for completed call connections, the service revenue is $M/(Erlang*Hop). The algorithm is shown in FIG. 2. Fixed routing is assumed. The objective of this algorithm is to maximize network revenue R by adjusting the number of reserved wavelengths and shared wavelengths according to the incident traffic distribution.

II. Numerical Example

In this section, we consider the network 10 being a 9-node ring as an illustrative example with the following assumptions:
1. The connection requests are Poisson distributed.
2. The holding time is exponentially distributed.
3. Blocked traffic is lost.
4. There is no blocking in the switching nodes 14.
5. A wavelength is chosen at random among all available wavelengths for a particular class of service.
6. There are 40 wavelengths on each physical links.
7. Traffic connection requests are uniformly distributed among all node pairs.

Figure 3:
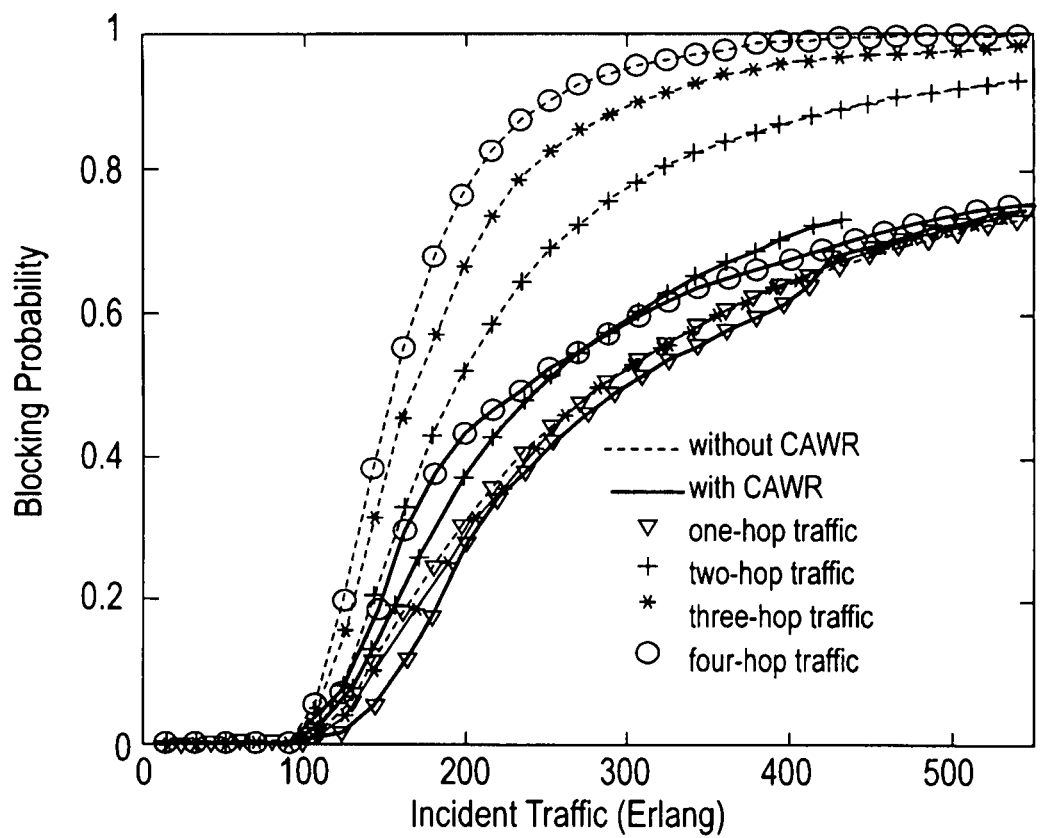
FIG. 3 is a chart showing a blocking probability of different classes of traffic with or without using the CAWR method.

FIG. 3 shows the blocking probability of different classes of traffic with or without using the CAWR method. We can see that with the use of the CAWR method the blocking probabilities of multi-hop traffic are lowered, and the difference among different traffic classes is also reduced.

Figure 4:
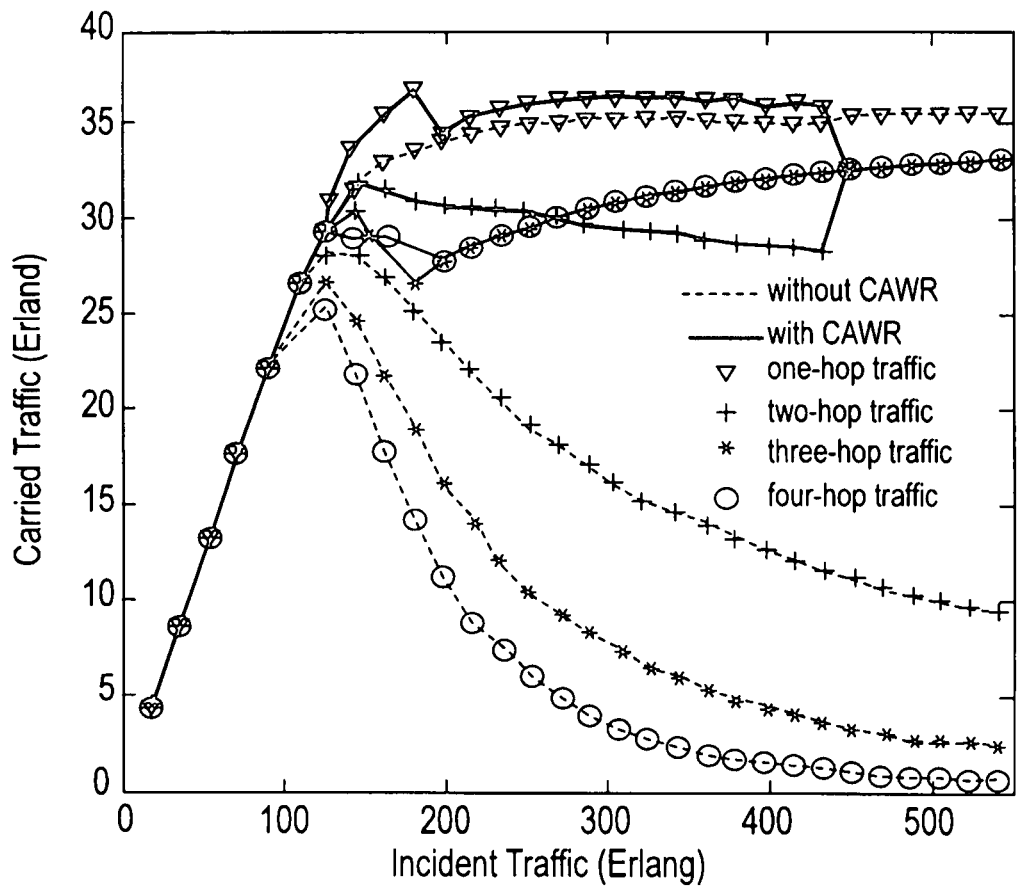
FIG. 4 is a chart showing a carried traffic for different traffic classes with or without using the CAWR method as a function of incident traffic.

FIG. 4 shows the carried traffic for different traffic classes with or without using the CAWR method as a function of incident traffic. We can see that using the CAWR method, the throughput of multi-hop traffic is increased. When the network is congested, multi-hop traffic can still be carried in the network instead of being almost entirely blocked, as proven in reference [7].

Figure 5:
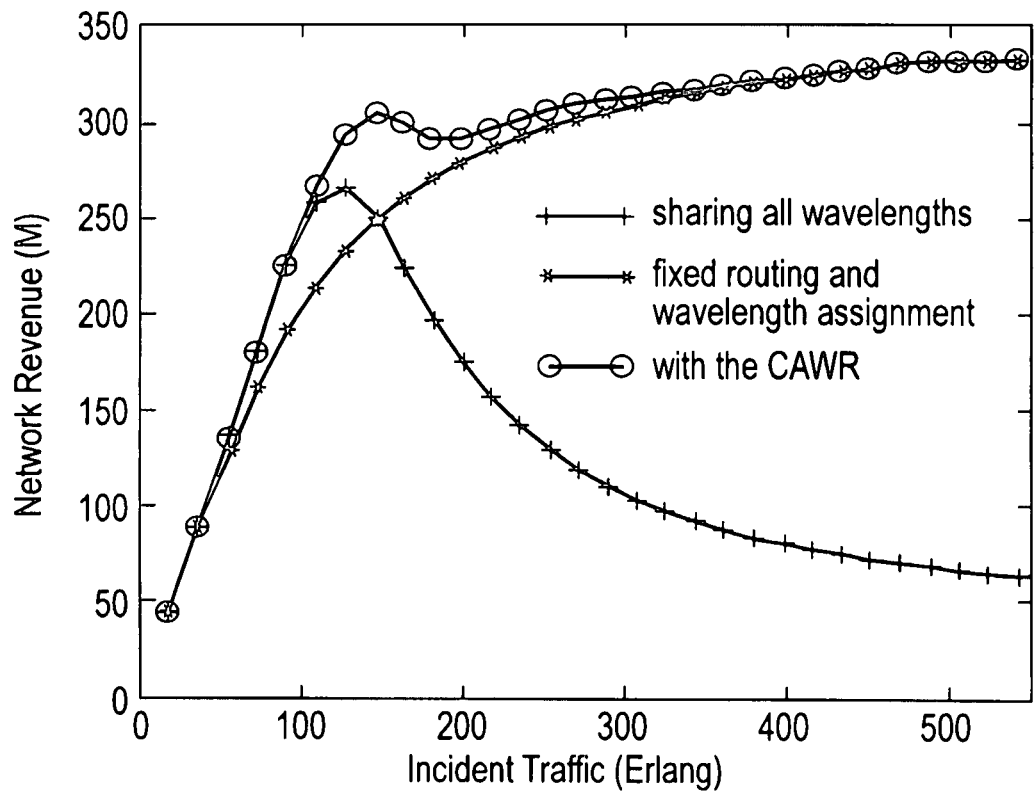
FIG. 5 is a chart showing the network revenue of an exemplary ring topology with or without using the CAWR method.

FIG. 5 shows the network revenue of the ring topology with or without the CAWR method. We see that the network achieves the best revenue under any traffic condition using the CAWR method.

III. Conclusion

One or more algorithm that we have called the Congestion Aware Wavelength Reservation are proposed to resolve the fairness problem in a DWDM network 10 with multiple classes of traffic, while at the same time maximizing the throughput of the network 10 and its attendant revenue. The CAWR algorithm recognizes three distinct states of the network 10 from the standpoint of congestion. First, under very lightly loaded situations, all wavelengths are available to any traffic request, independent of its destination or class. As the traffic increases, the network 10 resorts to a combination of reserved and unreserved wavelengths for different source-destination pairs, depending upon the level of traffic. A heuristic is described that will lead to an optimal choice for such an assignment. Finally, under very heavily loaded traffic condition, the network 10 resorts to a fixed assignment of all wavelengths to the different source-destination pairs. This assignment, in particular, insures that no traffic, irrespective of its class, is arbitrarily blocked by the network 10, i.e., any traffic that secures a path on the first link will complete its journey to the destination. The CAWR algorithm has thus generalized the available techniques for providing fairness while maximizing revenue at the same time for the entire spectrum of traffic.

4. References

The references set forth below are hereby incorporated herein by reference.

[1] Zang, H., Jue, J. P., and Mukherjee, B., "A review of routing and wavelength assignment approaches for wavelength-routed optical WDM networks", Optical Networks Magazine, vol. 1, no. 1, pp 47-60, January 2000.

[2] Barry R. A, Humblet P. A., "Models of blocking probability in all-optical networks with and without wavelength changers", IEEE journal on selected areas in communications, vol. 14 No. 5, pp. 858-867, June 1996.

[3] Li Y., Francisco M. J, Lambadaris I., Huang D., "Traffic Classification and Service in Wavelength Routed All-optical Networks", Communications, 2003. ICC '03. IEEE International Conference on, vol. 2, 11-15, pp. 1375-1380 May 2003.

[4] Ellinas G., "Wavelength Assignment Algorithms for WDM Ring Architectures", Optical Networks-Recent Advances, L. Ruan and D. Z. Du (Eds.) pp. 19-45.

[5] Birman, A., Kershenbaum, A., "Routing and wavelength assignment methods in single-hop all-optical networks with blocking", INFOCOM '95. Fourteenth Annual Joint Conference of the IEEE Computer and Communications Societies. Bringing Information to People. Proceedings. IEEE, vol. 2, 2-6, pp. 431-438, April 1995.

[6] Y Qu, P. K. Verma, and J. Cheung, "Enhancing the Carrying Capacity of a DWDM Network", Proceedings of 2004 International Conference on Parallel Processing Workshops (ICPPW '04), IEEE Communication Society, pp. 415-421, August 2004, Montreal, Canada.

[7] Y Qu, and P K. Verma, "Limits on the Traffic Carrying Capacity of Optical Networks with an Arbitrary Topology", IEEE Communications Letters, pp. 641-643, October 2004.

[8] Y Qu, P K. Verma, and J Cheung, "Wavelength Reservation and Congestion Control in Optical Networks", Proceedings of the IASTED International Conference on Optical Communications Systems and Networks (OCSN 2004), pp 790-795, July 2004, Banff, Canada.

[9] Lemieux, C, "Theory of Flow Control in Shared Networks and Its Application in the Canadian Telephone Network", IEEE Transactions on Communications, vol. 29, no. 4, pp. 399-413, April 1981.

Changes may be made in the embodiments of the invention described herein, or in the parts or the elements of the embodiments described herein, or in the steps or sequence of steps of the methods described herein, without departing from the spirit and/or the scope of the invention.

What is claimed is:

1. A method for enhancing the carrying capacity of a network, comprising the steps of:
   detecting, via one or more nodes in the network, the level of traffic incident on the network;
   sharing, by the one or more nodes, at least two wavelengths and reserving a first number of reserved wavelengths for traffic responsive to the level of traffic incident on the network being at a first level above a light load condition and below a high load condition, the first number including at least two reserved wavelengths; and
   changing, by the one or more nodes, the first number of reserved wavelengths to a second number of reserved wavelengths responsive to the level of traffic incident on the network being at a second level above the light load condition and below the high load condition, the second level being different from the first level.

2. The method claim 1, wherein traffic is classified based on the number of hops traveled from the source node to the destination node.

3. The method of claim 1, further comprising the step of predefining a route and a set of wavelengths for every source-destination node pair on the network responsive to the level of incident traffic on the network being at the high load condition.

4. The method of claim 1, further comprising the step of sharing wavelengths among all traffic requests responsive to the level of incident traffic on the network being at the light load condition.

5. A method for enhancing the carrying capacity of a network, comprising the steps of:
   sharing, by one or more nodes in a network, at least two wavelengths for a plurality of source-destination node-pairs in the network and reserving a number of reserved wavelengths for the plurality of source-destination node-pairs responsive to a first level of traffic incident on the network being above a light load condition and below a high load condition, the number of reserved wavelengths including at least two reserved wavelengths;
   changing the number of reserved wavelengths for the plurality of source-destination node-pairs in the network responsive to a second level of traffic incident on the network being above the light load condition and below the high load condition, wherein the wavelengths are dynamically reserved according to a level of traffic incident on the network and wherein the second level is different from the first level;
   receiving a connection request for a connection between one of the plurality of source-destination node-pairs;
   searching for an available reserved wavelength among the reserved wavelengths between the source-destination node-pair; and
   connecting the source-destination node-pair utilizing the available reserved wavelength.

6. The method of claim 5, wherein traffic is classified based on the number of hops traveled from the source node to the destination node.

7. The method of claim 5, further comprising the step of predefining a route and a set of wavelengths for every source-destination node pair on the network responsive to the level of incident traffic on the network being at the high load condition.

8. The method of claim 5, further comprising the step of sharing wavelengths among all traffic requests responsive to the level of incident traffic on the network being at the light load condition.

9. A switching node for use in directing traffic in a network, the switching node comprising:
   a processor detecting a first level of traffic incident on the network above a light load condition and below a high load condition and sharing at least two wavelengths and reserving a first number of wavelengths for traffic for at least one of a plurality of source-destination node pairs on the network, the first number including at least two reserved wavelengths, and changing the number of reserved wavelengths from the first number to a second number according to the level of traffic incident on the network being at a second level above the light load condition and below the high load condition, the second level being different from the first level.

10. The switching node of claim 9, wherein traffic is classified based on the number of hops traveled from the source node to the destination node.

11. The switching node of claim 9, wherein the processor predefines a route and a set of wavelengths for every source-destination node pair on the network responsive to the level of incident traffic on the network being at the high load condition.

12. The switching node of claim 9, wherein the processor shares wavelengths among all traffic requests responsive to the level of incident traffic on the network being at the light load condition.

13. A network router for use in routing traffic in a network, the network router comprising:
   a processor sharing at least two wavelengths for a plurality of source-destination node-pairs and dynamically reserving wavelengths for the plurality of source-destination node-pairs, wherein the number of reserved wavelengths changes from a first number to a second number responsive to a level of incident traffic on the network changing from a first level to a second level, the second level being different from the first level and the first and second levels being above a light load condition and below a high load condition, the processor receiving a connection request for a connection between one of the plurality of source-destination node-pairs, searching for an available wavelength among the reserved wavelengths between the source-destination node-pair; and
   connecting the source-destination node-pair utilizing the available reserved wavelength.

14. The network router of claim 13, wherein the processor predefines a route and a set of wavelengths for every source-destination node pair on the network responsive to the level of incident traffic on the network being at the high load condition.

15. The network router of claim 13, wherein the processor shares wavelengths among all traffic requests responsive to the level of incident traffic on the network being at the light load condition.

* * * * *